United States Patent [19]

Sippel

[11] 4,348,097
[45] Sep. 7, 1982

[54] CAMERA POSITIONING APPARATUS

[75] Inventor: Charles Sippel, Villa Park, Ill.

[73] Assignee: LogEtronics, Inc., Springfield, Va.

[21] Appl. No.: 167,595

[22] Filed: Jul. 10, 1980

[51] Int. Cl.³ .............................................. G03B 15/06
[52] U.S. Cl. .................................... 354/293; 354/290; 355/61
[58] Field of Search ................... 354/290, 293; 355/61

[56] References Cited

U.S. PATENT DOCUMENTS

| | | |
|---|---|---|
| 159,536 | 2/1875 | Bergstresser . |
| 584,182 | 6/1897 | Linley . |
| 2,376,416 | 5/1945 | Campbell ............................. 355/61 |
| 2,458,344 | 1/1949 | Carroll . |
| 3,130,632 | 4/1964 | Borrowdale ....................... 354/293 |
| 3,274,689 | 9/1966 | Schott . |
| 3,739,479 | 6/1973 | Blatherwick . |

Primary Examiner—Russell E. Adams
Attorney, Agent, or Firm—William D. Hall

[57] ABSTRACT

A picture taking apparatus is provided which accurately positions a camera lens with respect to the object being photographed. The apparatus comprises in part an element which is supported on and moves along a track. The track has equally spaced parallel pins extending in one direction therefrom and complementary indicator marks located on one face thereof. The element has a carriage which slides horizontally along a shaft of the element which is parallel to the track. The carriage has a cam-operated plate which slides vertically in said carriage to engage and disengage said pins. When the cam-operated plate engages a pin, the carriage is "fixed". This provides a "coarse" adjustment for the position of the camera lens. For the "fine" adjustment, the element is still free to move along the track. The element can be moved along the track to "fine tune" the position of the camera with respect to the object to be photographed. The exact position of the camera lens carried by the element is determined by a gauge which is fixably attached to the element. The gauge has an actuating projection which runs between the element and the carriage so that the precise distance the element is moved with respect to the fixed carriage can be determined.

10 Claims, 9 Drawing Figures

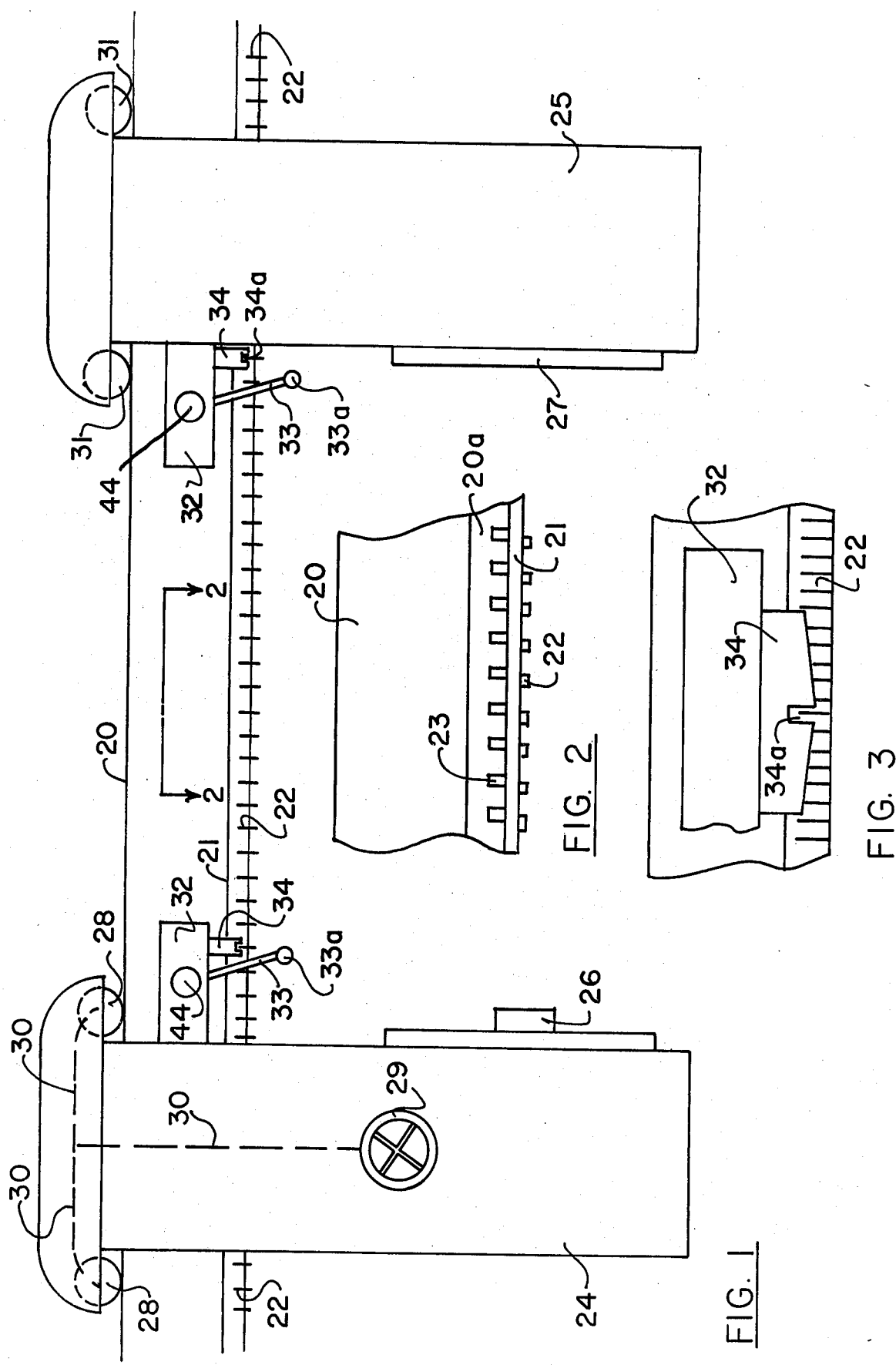

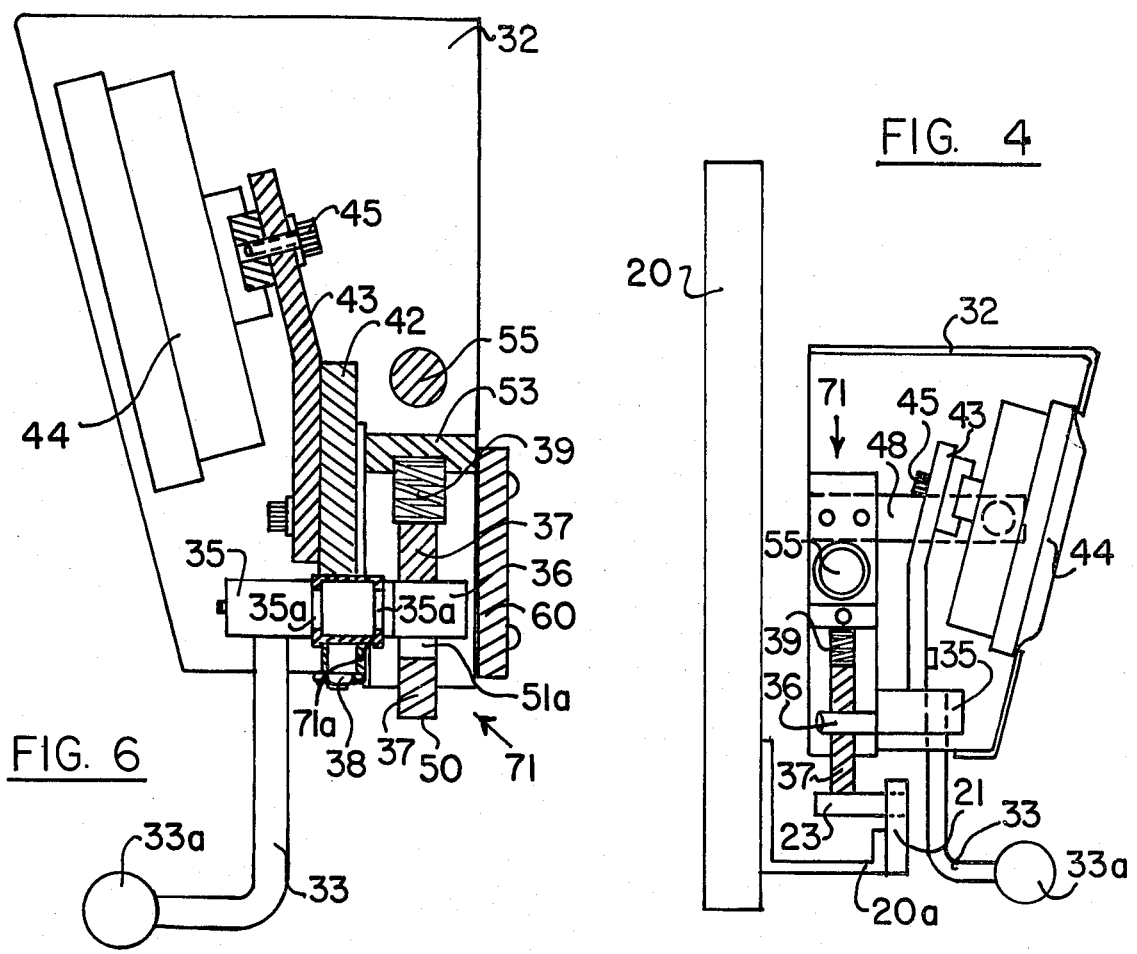
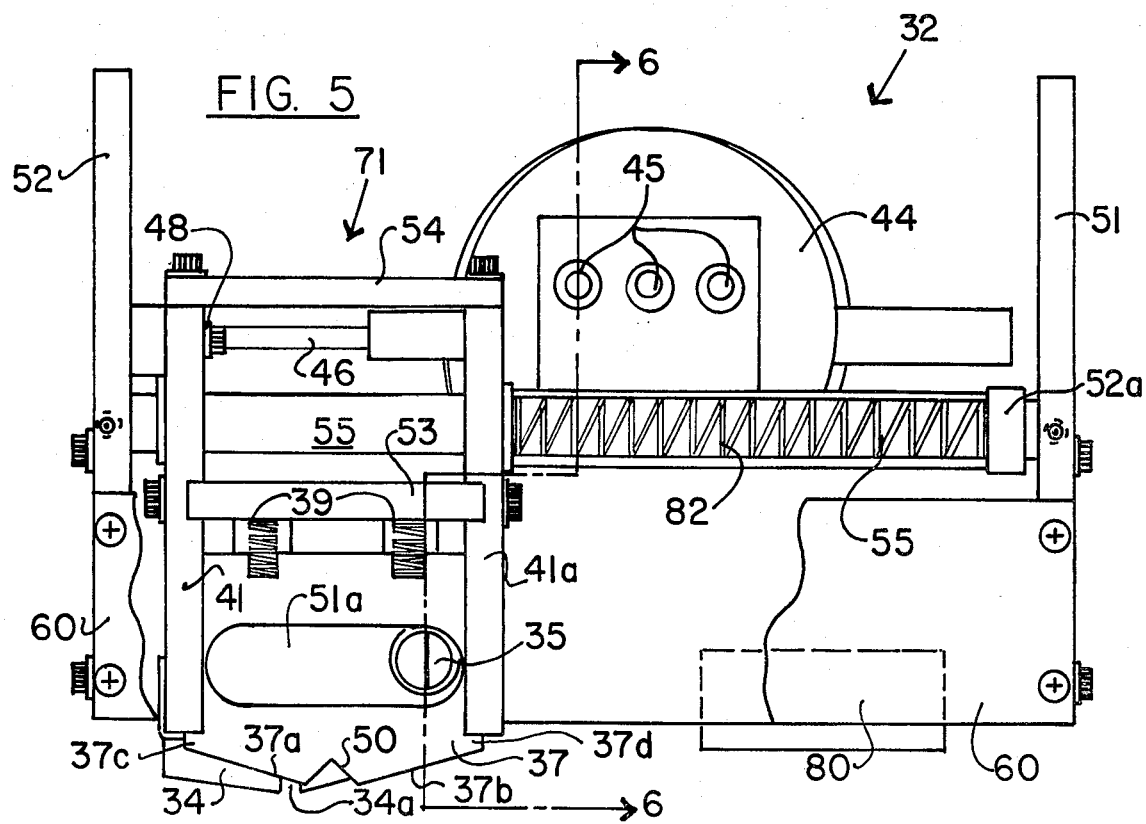

CAMERA POSITIONING APPARATUS

This invention relates to devices for positioning a camera with respect to an object to be photographed. More particularly, this invention relates to camera-carrying devices suspended from a track which can be accurately positioned a desired distance from an object to be photographed.

BACKGROUND OF THE INVENTION

The need to establish the relative positions of certain movable elements of a photographic camera system—for example, the lens and copyboard, relative to the film plane—and the requirement to be able to return each element precisely to a predetermined position relative to its associated elements, has occupied the attention of designers in the photographic field for many decades.

As early as Feb. 9, 1875, S. L. Bergstresser (U.S. Pat. No. 159,536 entitled "Camera") disclosed a belt and clamping device capable of adjusting and maintaining the position of the lens carrier of a camera relative to the associated image plane. On June 8, 1897, O. Linley patented a copying camera stand (U.S. Pat. No. 584,182 entitled "Copying Camera Stand") in which motion between the lens and copyboard, relative to the emulsion plane, is controlled by a system which includes a travelling nut and leadscrew, and a motion-limiting stop associated with a calibrated micrometer-screw adjusting means.

The concept of providing a precision dial indicator and incremental mounting means for use in measuring relative motion on machine tools, such as lathes and the like, is found in U.S. Pat. No. 2,458,344, issued to R. S. Carroll on Jan. 4, 1949, entitled "Precision Dial Indicator Mounting for Machine Tools". This device makes possible a quick change in the setting of the dial indicator for different depths or lengths of cut, and enables the major units in which the cut is measured to be accommodated by movement of the indicator bodily in the direction of the cut, while the desired fraction of the major unit is displayed by movement of the stem of the dial indicator itself. A refinement of the foregoing positioning technique appears in U.S. Pat. No. 3,274,689 issued on Sept. 27, 1966, to A. K. Schott entitled "Gaging Apparatus for a Machine Tool", wherein a single assembly containing a dial indicator may be slid along a horizontal bar having a series of aligned locating holes incrementally disposed along its length. The indicator assembly can be engaged and locked to any selected hole by means of a locating pin or plug, whereupon the dial indicator will display whatever relative motion takes place between its spindle and the workpiece.

Finally, Blatherwick (U.S. Pat. No. 3,739,479 issued June 19, 1973, entitled "Camera Carriage Precision Positioning System") shows a camera-positioning system which is somewhat similar to the Schott device in that each of several movable elements of the camera is provided with a movable carriage containing a dial indicator gauge capable of being pivoted vertically about a horizontal axis into, or out of, engagement with a precise, incrementally-notched horizontal bar fixedly mounted and extending along the length of the camera track. When the assembly is engaged with the bar, the dial indicator displays the position of the movable carriage between adjacent incremental notches.

There are two general types of camera-positioning systems currently in use. One type of system uses a scale tape connected to a gauge having gradations in percent of the size of the object to be photographed. The user of such a system moves the pointer of the gauge to the desired percent of size, and uses the scale tape to correctly position the camera means. While this device is relatively inexpensive and time efficient, the system's accuracy is relatively limited.

The second type of system employs an accurately machined lead screw for each carriage that is connected to a counter and a vernier dial. To accurately position the camera, the counter and dial are set to the numbers determined from a chart or from an equation. Although this system allows for relatively very accurate measurements and permits accurate repetition of a desired distance, the device is relatively expensive and time consuming to employ.

Thus, it is apparent that there is a need in the art for a camera-positioning device which is relatively inexpensive, can be quickly employed, and which is highly accurate as to the distances between the camera lens carried by the camera-positioning device and the object to be photographed.

This invention fulfills this need and other needs apparent to the skilled artisan in the relevant art once given the following disclosure:

SUMMARY OF THE INVENTION

Generally speaking, this invention provides a camera-positioning apparatus having an element for positioning a camera with respect to an object to be photographed supported by a track, said element being movable laterally along said track, means for moving said element to vary the distance of the camera lens from the object to be photographed, spaced parallel positioning pins extending outward from said track in a given direction, a reciprocating means movably attached to said element to engage said spaced pins, said element being movable along said track after said reciprocating means engages one of said spaced pins, a distance indicating gauge fixably carried by said element having an actuating projection for engaging said reciprocating means whereby the movement between said reciprocating means and said element is indicated by said gauge, whereby the engagement of said reciprocating means with one of said pins achieves a rough positioning of said camera lens with respect to said object to be photographed, and whereby the reading of the gauge gives a relatively accurate indication of the position of the camera lens from the object being photographed.

Certain embodiments of this invention will now be described in detail by reference to the accompanying drawings wherein:

IN THE DRAWINGS

FIG. 1 is a side view of a typical photographic arrangement incorporating the invention.

FIG. 2 is a cross-section along line 2—2 of FIG. 1.

FIG. 3 is a detailed view showing the function of plate 34 in its relation to indicator marks 22 and is an enlarged side view of a small portion of FIG. 1.

FIG. 4 is a cross-sectional view of the track rail 20 and the control box 32 of FIG. 1.

FIG. 5 is a rear view of the control box 32 with certain portions broken away for clarity.

FIG. 6 is a cross-sectional view along line 6—6 of FIG. 5.

DETAILED DESCRIPTION OF THE DRAWINGS

Figure 7:
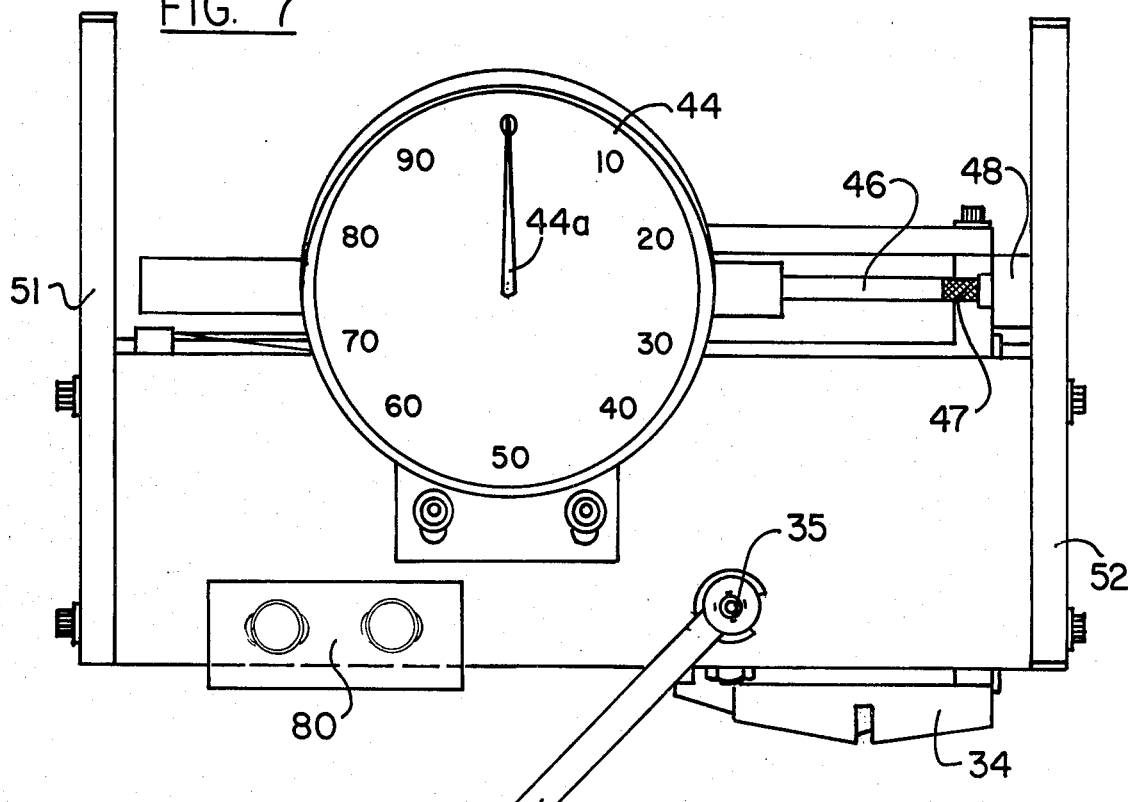
FIG. 7 is a front view of the control box 32 with certain portions omitted.

In FIG. 1 a main heavy track rail 20 is mounted above the floor of a building and has a front rail 21 of relatively small height compared to the height of the main track rail 20. The front rail 21 is attached to and spaced forward of the main track rail 20 by bracket 20a (shown in FIG. 4) and carries on its front side a series of indicia 22. Preferably these indicia 22 are equally spaced and may be, for example, one inch apart. Projecting rearwardly from the front rail 21, there is a round pin 23 complementary to each indicia 22 (see FIG. 2). Therefore, the pins 23 are parallel to each other and are all located in the same horizontal plane.

Two main elements 24 and 25 are carried by the track rail 20. Element 24 may carry, for example, a camera lens 26 and element 25 may carry, for example, an object 27 which is to be photographed. The function of this equipment is to accurately position the camera lens 26 with respect to object 27. For that purpose, element 24 is mounted on wheels 28 that move along track rail 20. The operator may cause the element 24 to move toward or away from element 25 to a desired degree by rotating hand wheel 29 which is connected by a suitable drive mechanism 30 to the wheels 28, to rotate the wheels 28 in the desired direction. Similarly, the element 25 is supported by wheels 31 and may have a suitable driving mechanism similar to that employed by element 24 and, therefore, not shown.

Each element 24 and 25 has a complementary control box 32 for accurately indicating the position of the element 24 or 25, as the case may be, along the track rail 20. There is a coarse positioning means (hereinafter described in detail) located in control box 32 which engages the desired one of the many pins 23 and thus provides a coarse positioning of the element 24 (or 25 as the case may be). A carriage 71, within control box 32, hereinafter described, carries a plate 34 protruding downwardly from control box 32 and extending in front of the rail 21. Plate 34 has a slot 34a which straddles a given one of indicia 22 when the control box is properly positioned with respect to that indicia. The operator may see an indicia mark 22 through slot 34a when carriage 71 is correctly positioned with respect to that indicia (see FIG. 3). The operator may, therefore, conclude that he has selected the pin 23 which is complementary to the particular indicia 22 which appears in the slot 34a and which the operator desires to engage as described later. For purposes of convenience, the indicia 22 on the front of rail 21 may be numbered. If each indicia represents one inch, the operator, by looking at the marks 22 that are visible through slots 34a in the plates 34 on elements 24 and 25, may easily compute the distance between the two plates 34, and hence between lens 26 and object 27. This will give a "coarse" reading which will enable the distance, in inches, between the elements 24 and 25 to be roughly calculated. It is, of course, possible to have one of the elements 24 or 25 stationary, in which event the other element will move with respect thereto and the various indicia will give a direct "coarse" reading of the distance between elements 24 and 25, rendering computations unnecessary.

We will next describe how the apparatus in control box 32 may be operated to select a given pin 23 and to indicate the exact position of the element 24 (or 25) if its exact position falls between two pins 23. In this connection, it is understood that the two control boxes 32 are rigidly fixed to their respective elements 24 and 25.

Figure 9:
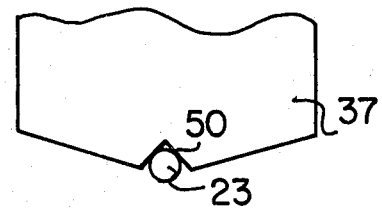
FIG. 9 is a detailed view showing the engagement of notch 50 with a pin 23.
Figure 8:
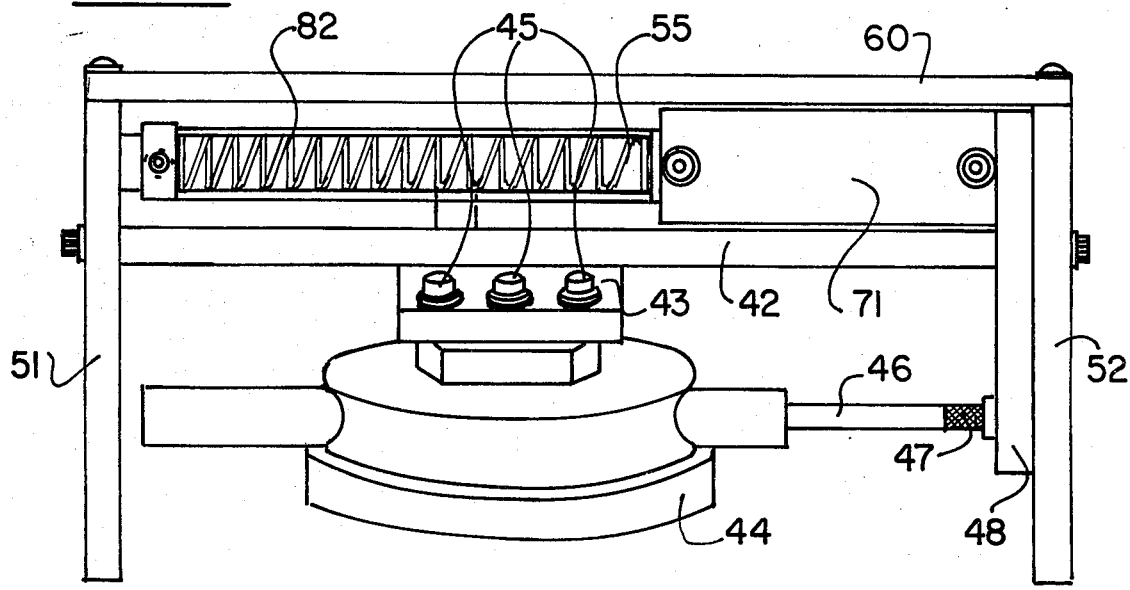
FIG. 8 is a top view of control box 32 with certain portions omitted.

Referring to FIG. 4, the main track rail 20 has a bracket 20a attached thereto which supports the small front rail 21 which in turn supports pin 23. As will appear, carriage 71 (hereinafter described) carries a plate 37 (best shown in FIGS. 4, 5 and 6) which is urged downwardly by springs 39. Plate 37 has two basic positions, one of which is an up and one of which is a down position. Plate 37 also has a notch 50 which engages the selected one of pins 23, as shown in FIG. 9, when plate 37 is in its "down" position. When the arm 33 (which carries knob 33a) is in the angular position shown in FIG. 7, a cam 36 (FIG. 4) at one end of the shaft 35, which carries arm 33 near the other end, holds plate 37 in its "up" position against the force of the springs 39. In this case notch 50 is out of engagement with the pins 23, and thus the element (24 or 25) can be freely moved along main track rail 20. If, however, the arm 33 of FIG. 7 is rotated counterclockwise, the cam 36 will rotate and allow springs 39 to press the plate 37 to the "down" position so that notch 50 will seat upon and engage one of the pins 23 and thus hold the plate 37 (and thus carriage 71) in a given position with respect to the track 20 and the rail 21. In this respect, it is noted that the plate 37 is carried by two vertical side rails or plates 41 and 41a (FIG. 5).

The carriage 71 (FIGS. 4–6 and 8) is made up of the two side plates 41, 41a, interconnected by cross-members 53 and 54. The carriage also includes vertically reciprocating plate 37 with its notch 50, and springs 39. As stated earlier the carriage 71 also supports plate 34 which has notch 34a therein. The notches 34a and 50 are in two vertical parallel planes that are a fixed distance apart. The upper ends of springs 39 are carried by cross-member 53. The plates 41 and 41a have vertical slots in which the free side end portions 37c and 37d, respectively, of the vertical reciprocating notched plate 37 may slide. It is noted that carriage 71 is movable against the force of main spring 82 with reference to all of the other elements of control box 32, all as will appear as this description proceeds.

The shaft 35 is rotatably mounted in fixed relation to side plates 51 and 52 in any suitable manner. For example, plate 42 may extend from one end to the other end of control box 32, that is, plate 42 is supported at its two free ends by the two end plates 51 and 52 of control box 32. In other words, plate 42 is supported in a manner similar to plate 60 (described later), and is parallel to and forward of plate 60. The bearing 71a is located in a hole in plate 42 and is, therefore, carried by plate 42. The two E-rings 35a are mounted on the shaft 35 with one of these E-rings adjacent the front side of plate 42 and the other adjacent the rear side of that plate. Accordingly, the two E-rings 35a prevent excessive axial movement of the shaft 35. The following parts move as a unit: knob and arm 33, shaft 35, E-rings 35a, and cam 36.

The plate 37 has a slot 51a to enable shaft 35 to move with reference to carriage 71 when the carriage 71 moves relative to the side plates 51 and 52 of the main frame of the control box 32.

The main frame comprises side members 51 and 52 connected by plate 60. The main frame also carries a spring and spring plunger assembly 38, mounted on the framework of the control box 32 and which applies a resilient force to the shaft 35 to prevent unwanted rotation of that shaft.

The side rails or plates 41 and 41a, of carriage 71, are carried by a main shaft 55 which is supported at each of its ends by end plates 51 and 52 of the control box 32. These end plates are in turn rigidly connected together by several plates such as front plate 60 to thus form a rigid structure. The two side plates 41 and 41a together with cross pieces 53 and 54 (carriage 71) are, therefore, able to move to the right horizontally along shaft 55 since none of these members are attached to any of the members forming the rigid structure of control box 32. However, when these members (41, 41a, 53 and 54 forming carriage 71) move to the right as seen in FIG. 5, they do so against the force of large helical coil spring 82. The coil spring 82 tends to hold the carriage 71 toward the left side of the control box 32 as shown in FIG. 5 which is a rear view of control box 32. Spring 82 is placed around shaft 55 between plate 41a and member 52a. Member 52a is received on shaft 55 and abuts side member 51.

Plate 42 (see FIG. 8) extends between end plates 51 and 52 as stated earlier and supports plate 43, to which is attached a gauge 44 by means of suitable bolts 45. The gauge 44 has a movable projection 46 best shown in FIGS. 5, 7 and 8. The projection 46 has a free end portion 47 having a very flat hard end surface which in turn engages a very accurately positioned plate 48 of hard material. The plate 48 is in turn supported by the carriage 71 and moves with it.

The shaft as shown in FIG. 4 is rotated by an angle of 90° from its angular position of FIG. 6.

Let us assume that the operator desires to position element 24 at a particular location along the track, for example, 36.040 inches. First, he will begin with the arm 33 in its clockwise position shown in FIG. 7. He will then rotate the hand wheel 29 until the notch 34a in plate 34 straddles the particular one of indicia 22 that represents 36 inches. The operator will then rotate arm 33 counterclockwise to the position shown in FIG. 1 and this will rotate cam 36, lowering plate 37 until the notch 50 engages the particular pin 23 which represents 36 inches. This causes the plate 37 to accurately center the notch 50 on the pin 23 and thus firmly locate carriage 71 into a given position representative of 36 inches from the starting point. Let us next assume that the operator moves the hand wheel clockwise so as to further move element 24 toward element 25. The carriage 71, of course, remains stationary since notch 50 is in engagement with a pin 23. Looking at the control box from the rear, as shown in FIG. 5, this means that notch 50 (and thus plate 37 and carriage 71) remain stationary while end plates 51 and 52 move toward the left, thus compressing spring 82. Moreover, the plate 48 on the carriage 71 presses upon end 47 of projection 46 and thus causes the pointer of the gauge 44 to rotate until it reads 40. This indicates that plate 52 has moved 0.040 inch away from carriage 71. As a result, the operator is now able to conclude that element 24 is positioned at a point designated 36.040 inches along the track 21. He concludes that it is 36.040 inches because notch 34a straddles the 36-inch indicia 22, and the gauge 44 reads 40.

As shown in FIG. 7, a plate 80 is adjustable horizontally, and this plate has a lower portion (FIG. 5) that extends rearwardly of plate 60 and acts as a stop to limit motion of the main frame 51, 52, 60 to the left relative to side rail 41a. While the main frame 51, 52, 60 is moving leftwardly (FIG. 5) during the "fine" adjustment the carriage 71 is stationary. When the main frame exceeds one inch of motion, stop member 80 engages side rail 41a and limits further motion.

It is noted that the operator does not absolutely need to operate the arm 33 to raise the plate 37 when moving from one pin to another. The fact is that he can move the element 24 in either direction while arm 33 remains in the clockwise position shown in FIG. 1. Thus, when the end plates 51 and 52 have moved to one extreme or the other with respect to carriage 71, any further movement of the member 24 will simply cause the pins 23 to press upon the tapered lower end 37a or 37b, as the case may be, and press the plate upwardly against the force of springs 39 whereby the apparatus may skip one or more pins before stopping with the notch 50 in engagement with another pin 23.

It is, of course, also possible, in accordance with conventional practice, for the object to be photographed to be carried by a stationary wall located to the right of element 25, the lens board to be carried by element 25, and the film to be carried by element 24. The two control boxes 32 enable the operator to correctly position elements 24 and 25 with respect to the object to be photographed.

I claim to have invented:

1. In picture taking apparatus,
    (a) at least one element for varying the distance between a part of a camera and an object to be photographed,
    (b) a track for supporting said element for movement to thus enable said distance to be varied,
    (c) means for moving said element along said track to change the relative position of said part of the camera and the object to be photographed,
    (d) incremental locating means mounted on said track for defining a series of locations along said track, and
    (e) reciprocating means carried by said element for engaging and disengaging said incremental locating means to position said reciprocating means in a selected one of said series of locations along said track,
    the improvement comprising:
    means, including carriage means, mounting said reciprocating means on said element to permit relative movement between said reciprocating means and said element parallel to said track, so that relative movement parallel to said track may occur between the element and the reciprocating means when the reciprocating means has engaged the incremental means and the element is moved parallel to the track and with respect to the incremental location means, said reciprocating means being mounted to reciprocate in said carriage means for engaging and disengaging said incremental locating means, and
    a distance indicating gauge carried by said element in fixed relationship thereto and having an actuating projection extending therefrom for engaging said carriage means, so that when said element moves relative to said reciprocating means the amount of such movement will be indicated by said gauge,
    whereby the engagement of the reciprocating means with the incremental means achieves a relatively coarse position of said element and the reading of said gauge is a relatively fine indication of the position of the element with respect to one of said locations.

2. In picture taking apparatus according to claim 1, said incremental locating means including equally spaced parallel pins extending perpendicular to said track.

3. In picture taking apparatus according to claim 2, said element comprising a rod extending parallel to said track,
said carriage means being mounted on said rod,
said carriage means and said rod being designed such that said carriage means is capable of sliding along said rod in directions parallel to said track.

4. In picture taking apparatus according to claim 3, said reciprocating means comprising an engaging plate having a lower end,
said carriage means comprising two end plates each having a slot therein to receive said engaging plate,
said engaging plate being slidably located for vertical motion in said slots,
said engaging plate having a notch in said lower end thereof to engage a selected one of said pins,
said projection engaging one of said end plates.

5. In picture taking apparatus according to claim 4,
said carriage means, further comprising a cross support fixably connecting said end walls,
at least one spring which is positioned between said cross support and said engaging plate,
said engaging plate having two stable positions, an up position and a down position,
whereby when said engaging plate is in the "up" position said notch does not engage any one of said pins and said spring is in compression.

6. In picture taking apparatus according to claim 5, said engaging plate defining a hole,
said carriage means further comprising a crank arm and a cam, said crank arm having at least two angular positions into which it may be manually rotated,
said cam extending into said hole, and engaging the upper wall of the inner surface of the portion of the engaging plate defining said hole in one angular position of said crank arm,
said cam being attached to said crank arm such that when said crank arm is rotated from one of said angular positions to the other the cam will rotate and raise said plate.

7. In picture taking apparatus according to claim 6,
a second spring positioned such that movement of said carriage means with respect to said shaft in one direction is resisted by said second spring.

8. In picture taking apparatus according to claim 7, said element carrying a camera means.

9. In picture taking apparatus according to claim 8, a second element supported by said track, said second element being substantially the same as the first element except said second element carries an object to be photographed instead of said camera means.

10. In picture taking apparatus as defined in claim 9, said distance indicating gauge comprising:
a scale graduated in units of distance,
a pointer movable with respect to said scale to indicate distance,
said actuating projection extending from the gauge, and
means operable in response to movement of said projection inwardly toward the pointer for moving the pointer along said scale to thus indicate the amount of movement of said actuating projection.

* * * * *